Jan. 19, 1937.　　　F. G. THWAITS　　　2,067,993
VEHICLE TANK STRUCTURE
Filed May 31, 1934　　　2 Sheets-Sheet 1
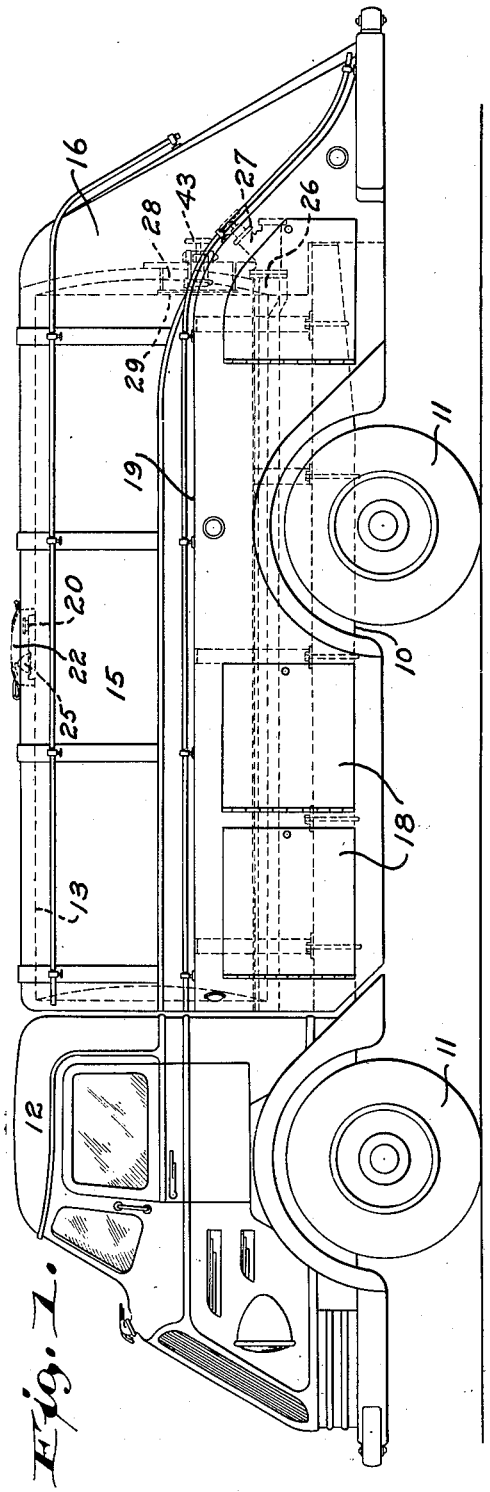
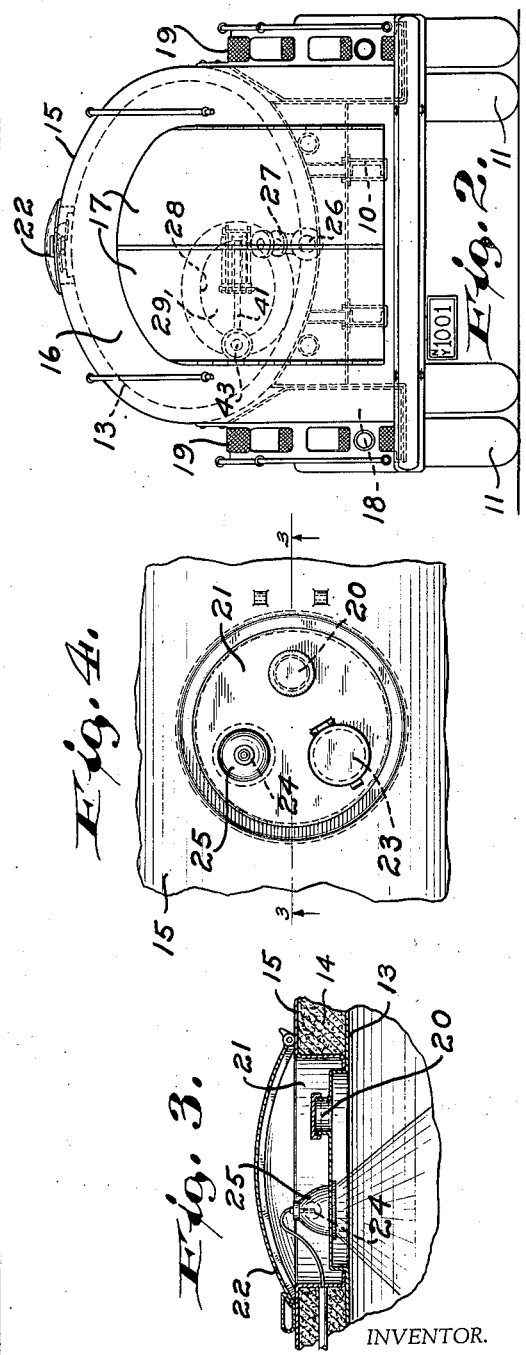
INVENTOR.
F. G. Thwaits
BY
Morsell, Lieber & Morsell
ATTORNEYS.

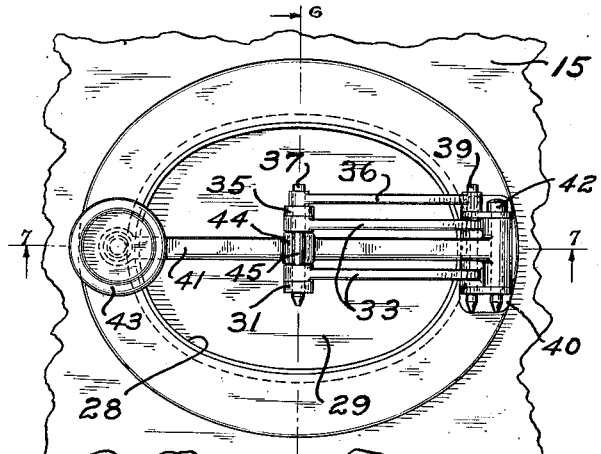
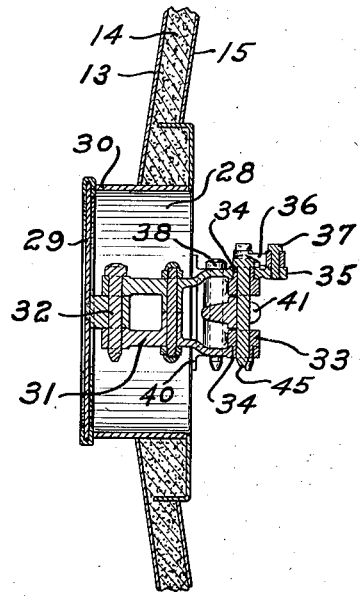
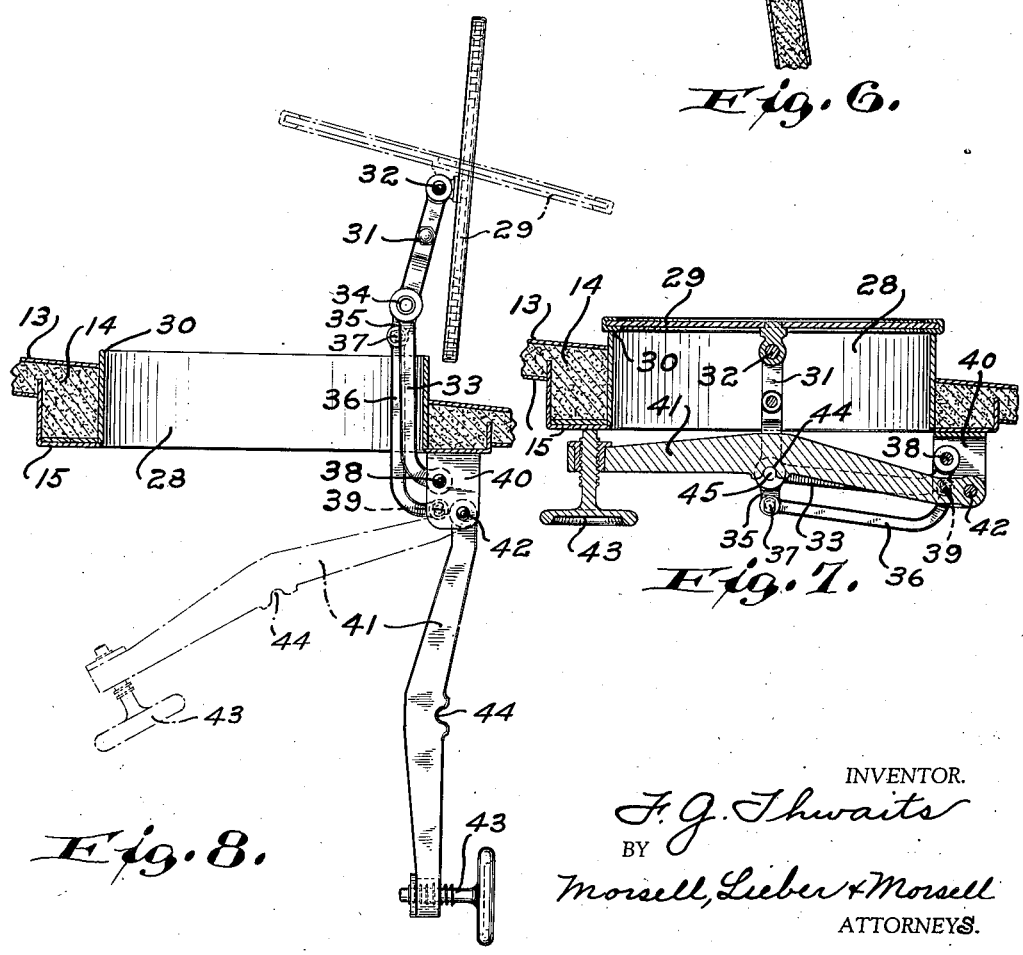

Patented Jan. 19, 1937

2,067,993

UNITED STATES PATENT OFFICE 2,067,993

VEHICLE TANK STRUCTURE

Frederick G. Thwaits, Wauwatosa, Wis., assignor to The Heil Co., Milwaukee, Wis., a corporation of Wisconsin Application May 31, 1934, Serial No. 728,349

11 Claims. (Cl. 220—25)

The present invention relates in general to improvements in vehicle tank structures and closures therefor.

An object of the invention is to provide various improvements in the construction of tanks for storing and dispensing liquid such as milk, whereby the interior of the tank is readily accessible for inspection and cleaning, and which make the tank structure especially adapted for use in connection with stream-lined vehicles.

It has long been customary to mount liquid storage and dispensing tanks upon motor vehicles in order to permit rapid transportation of liquids in bulk. As a rule these prior tank structures are provided with relatively large manholes at the top for permitting filling and entry to the interior of the tanks for cleaning purposes, and the bottoms of these tanks are provided with dispensing conduits for permitting withdrawal of the liquid therefrom. The manholes must be relatively large in order to permit convenient passage of an individual, and the prior disposition of these manholes and of the closures therefor has proven quite objectionable when it becomes desirable to eliminate excessively large projections for stream-line purposes. While it has heretofore been proposed to dispose the manhole covers in troughs or pockets somewhat below the topmost portion of a tank of this type, and to cover the successive manhole closures with a walk extending longitudinally along the top of the tank, such construction while producing the desired stream-line effect, is rather costly especially when applied to a single compartment tank. It is moreover quite a problem in the cleaning of these prior tank structures, to provide adequate lighting for the tank interior, thus making it difficult to maintain the prior structures in sanitary condition.

The present invention therefore contemplates provision of an improved tank structure especially adapted to be mounted upon and transported by a vehicle, wherein desirable streamlining is possible, and in which the tank interior may be conveniently maintained in sanitary condition.

More specifically defined, one object of the invention is to provide an improved vehicle tank structure which is entirely devoid of lateral or top projections which will tend to prevent free movement of the vehicle or excessive resistance to the travel thereof.

Another specific object of the invention is to provide an improved tank structure all portions of the interior of which are readily accessible and visible for inspection and cleaning.

A further specific object of the invention is to provide an improved readily removable closure for manholes or the like, which while being conveniently manipulable for opening and closing, also affords a perfect seal.

Still another specific object of the invention is to provide an improved lighting system for illuminating the interior of a tank or the like, either during filling or while access to the tank interior is being effected through a manhole or other opening.

These and other objects and advantages will be apparent from the following detailed description.

A clear conception of embodiments of the several features of the invention, and of the mode of constructing and of utilizing vehicle tank structures built in accordance with the improvement, may be had by referring to the drawings accompanying and forming a part of this specification in which like reference characters designate the same or similar parts in the various views.

Fig. 1 is a side elevation of a motor driven tank vehicle having stream-line contour, and embodying the improvements;

Fig. 2 is a rear end view of the tank vehicle;

Fig. 3 is an engaged fragmentary section through the upper portion of the tank at the filling opening and lighting means, the section being taken along the line 3—3 of Fig. 4;

Fig. 4 is a full top view of the filling and lighting portion of the tank, with the protecting cover removed;

Fig. 5 is an elevation of a portion of the rear end of the tank looking toward the manhole opening and cover;

Fig. 6 is a central vertical section through the manhole and closure therefor, taken along the line 6—6 of Fig. 5;

Fig. 7 is a central horizontal section through the manhole and closure, showing the closure in sealing position, the section being taken along the line 7—7 of Fig. 5; and Fig. 8 is a similar section through the manhole and closure, showing the closure swung into full open position.

While the invention has been shown and described herein as being applied to a single compartment vehicle drawn tank especially adapted for the cartage of liquid such as milk, it is not intended to limit the scope by such specific embodiment, since some of the novel features are obviously more generally applicable to other types of tank structures.

The motor vehicle illustrated in Figs. 1 and 2, comprises in general a chassis 10 mounted upon wheels 11 which are driven by an engine disposed near the driver's cab, and a single compartment tank 13 mounted upon the chassis 10 rearwardly of the cab 12. The tank 13 is covered by a layer of insulation 14 which is completely confined within an outer shell 15 forming a rear housing 16 accessible through doors 17 as shown in Fig. 2. The opposite sides of the tank portion of the vehicle, are provided with additional housings 18 above which are located running boards 19, and the rear portions of the housings 16, 18 are inclined as shown in Fig. 1 in order to produce a stream-line appearance.

The central portion of the top of the tank structure is provided with a filling opening 20 of relatively small diameter, which is normally closed by a readily removable cap as shown in Figs. 3 and 4, and this cap is accessible through an opening 21 in the insulation 14 and shell 15, which is normally closed by a hinged cover 22. The portion of the tank 13 within which the opening 20 is formed, is also provided with a sight opening 23 and with a lamp opening having an electric lamp 24 and a reflector 25 associated therewith, both of these likewise being accessible through the opening 21 and cover 22. The lamp 23 may be connected directly to the lighting system of the vehicle, and the reflector 25 is formed to distribute the light rays throughout the major portion of the interior of the tank 13 which is ordinarily polished so as to further reflect and distribute the light rays throughout the entire compartment.

The lowermost rear portion of the tank 13 is provided with a liquid dispensing conduit 26 having a valve 27 associated therewith, this valve 27 being located within the rear housing 16 and being accessible through the rear doors 17. The lower portion of the rear end of the tank 13 within the housing 16, is also provided with a relatively large manhole opening 28 which is adapted to be normally sealed by a closure plate 29 as shown in Figs. 5 to 8 inclusive. The closure plate 29 is adapted to coact with an elliptical seating 30 disposed within the tank 13, and is pivotally attached to the inner end of a composite link 31 by a pin 32. The outer end of the link 31 is pivotally attached to the swinging end of a double lever 33 by means of integral hollow pivots 34, and has an integral projection 35 which is pivotally attached to the swinging end of an auxiliary lever 36 by a pin 37. The opposite ends of the parallel levers 33, 36 are mounted on pivots 38, 39 respectively both of which are supported by a bracket 40 secured to the shell 15 near the manhole opening 28. A beam member 41 which is also swingably supported by a pivot 42 carried by the bracket 40, is adapted to be swung across the manhole opening 28 as shown in Figs. 7 and 8, and has its swinging end provided with an adjustable screw element 43 which is adapted to coact with the shell 15 on the side of the opening 28 opposite to the bracket 40. The medial portion of the beam member 41 has a socket 44 therein, and this socket is adapted to engage a removable pin 45 which passes through the hollow pivots 34 as clearly shown in Fig. 6. The adjusting screw element 43 and the beam member 41 are readily accessible through the rear doors 17 and are freely manipulable from within the rear housing 16 when these doors are open.

When the vehicle is being propelled from place to place, the doors 17 and top cover 22 are disposed substantially as shown in Figs. 1 and 2, the manhole closure plate 29 being in closed position, the valve 27 being closed, and the openings 20, 23 likewise being closed. In order to admit liquid to the tank 13, it is only necessary to open the cover 22 and the opening 20, whereupon a filling nozzle may be passed through the opening 20 and the liquid admitted. By uncovering the opening 23 and turning on the light 24, the interior of the tank 13 may be readily viewed through the opening 23, and when filling has been effected, the cover 22 may again be closed. The liquid may then be withdrawn as desired through the conduit 26 and valve 27, access to these parts being obtained through the doors 17 of the rear compartment 16.

When it becomes desirable to obtain access to the interior of the tank 13 for inspection or cleaning purposes, the light 24 may be turned on, and the screw 43 may be manipulated to release the pressure upon the cover plate 29 exerted through the pin 45. Upon removal of the pin 45 after the screw 43 has been released, the beam member 41 may be freely swung to the position shown in Fig. 8. If the tank 13 is empty, the closure plate 29 may be subsequently swung inwardly away from the seating 30 and may thereafter be adjusted about its pivot pin 32 to the position indicated. With the plate 29 thus positioned, free access to the interior of the tank 13 is permitted. While the levers 33, 36 are being swung inwardly through the manhole opening 28, the auxiliary lever 36 will function to cause the link 31 to swing in the manner illustrated in Fig. 8, so as to prevent the closure plate 29 from swinging against the interior of the tank 13. This feature is of importance and the inward striking of the plate against the interior of the tank has proven somewhat objectionable in connection with a structure such as shown in my prior Patent #1,870,973. granted August 9th, 1932, especially when the device was applied to a vertically disposed manhole closure. After the closure plate 29 has been removed for access to the interior of the tank, the light 24 will effectively illuminate the tank interior and will make thorough cleaning and inspection thereof possible.

The closure plate 29 may be readily swung into closed position in contact with the seating 30, by merely swinging the levers 33, 36 outwardly about their pivots 38, 39, after which the beam member 41 may again be swung into the position shown in Fig. 7 and the pin 45 applied to the hollow pivots 34. The subsequent manipulation of the screw 43 will cause the beam member 41 to swing outwardly and to apply sealing pressure to the closure plate 29 through the link 31 and pin 45. Any desired degree of pressure necessary for effective sealing may be applied to the hand wheel of the screw element 43.

From the foregoing description it will be apparent that the present invention provides an improved vehicle tank structure which is entirely devoid of undesirable projections tending to retard advancement of the vehicle. The cover 22 provided at the top of the tank is relatively small and unobstructive as compared to the prior closures for manholes located along the top of the tank structure, and the housing 17 at the rear of the vehicle is shaped to cause minimum resistance to the advancement of the vehicle. The disposition of the light 24 at one side of the filling opening 20, and the provision of a second sight opening 23 located adjacent to the light, provides for maximum visibility of the interior of the container. The location of the manhole opening 28 near the bottom of the tank, also facilitates entry to the interior thereof, and the improved mechanism for effecting opening and closing of the manhole closure plate 29 facilitates inspection and cleaning of the tank structure. The improved assemblage has proven highly successful in actual commercial operation, especially in connection with vehicle tanks for transporting milk. In such tanks it is desirable to provide insulation 14 and this insulation in no manner obstructs the normal functioning of the tank and of the mechanism associated therewith.

While the dispensing valve 27 is in the present disclosure, accessible from within the rear housing 16, it should be understood that this valve may be, in some cases, accessible through the side housings 18 instead of through the rear housing. The particular tank shown herein is a single compartment tank, but in many instances these tanks are divided into several compartments and the present invention would obviously be applicable to each section of a multiple compartment tank in the same manner as it is applied herein. This alternative use of single and multiple compartment tanks is well known in the art, and the application of filling and discharge arrangements and of a manhole closure mechanism to each of the several compartments of a multiple compartment tank, would be readily understood by those skilled in the art.

It should be understood that it is not desired to limit the invention to the exact details of construction herein shown and described, for various modifications within the scope of the claims may occur to persons skilled in the art.

It is claimed and desired to secure by Letters Patent:

1. A tank structure, comprising, a tank having an opening, a closure plate for said opening, a lever pivotally associated with said tank, a link pivotally attached at one end to said plate and at its opposite end to the swinging end of said lever, the connection between said link and lever consisting of a hollow pivot, a member movably associated with said tank and having its medial portion disposable adjacent to said pivot, and a pin penetrating said pivot and cooperating with said medial member portion.

2. In combination, a tank having an opening, a closure plate for said opening, a pair of levers having corresponding ends pivotally supported to swing about different axes, a link attached to said plate, a pivot connecting the swinging end of one of said levers with one portion of said link, and another pivot connecting the swinging end of the other of said levers with another portion of said link.

3. In combination, a tank having an opening, a closure plate for said opening, a pair of levers having corresponding ends pivotally supported to swing about different axes, a link having one end pivotally attached to said plate, a pivot connecting the swinging end of one of said levers with the opposite end of said link, and another pivot connecting the swinging end of the other of said levers with a medial portion of said link.

4. In combination, a tank having an opening, a closure plate for said opening, a pair of levers having corresponding ends pivotally supported to swing about different axes, a link attached to said plate, a pivot connecting the swinging end of one of said levers with one portion of said link, another pivot connecting the swing end of the other of said levers with another portion of said link, and a beam cooperable with one of said pivots to force said plate into closed position.

5. In combination, a tank having an opening, a closure plate for said opening, a pair of levers having corresponding ends pivotally supported to swing about different axes, a link having one end pivotally attached to said plate, a pivot connecting the swinging end of one of said levers with the opposite end of said link, another pivot connecting the swinging end of the other of said levers with a medial portion of said link, and a beam cooperable with said last mentioned pivot to force said plate into closed position.

6. In combination, a tank having an opening, a closure plate for said opening, a pair of parallel levers pivotally attached to said tank to swing about different axes, a link pivotally attached to said plate, a pivot connecting the swinging end of one of said levers with one portion of said link, another pivot connecting the swinging end of the other of said levers with another portion of said link, a beam cooperable with said last mentioned pivot to force said plate into closed position, and means for adjusting said beam relative to said tank.

7. In combination, a tank having an opening, a closure plate for said opening, a pair of levers having corresponding ends pivotally supported to swing about different axes, a link attached to said plate, a pivot connecting the swinging end of one of said levers with one portion of said link, a hollow pivot connecting the swinging end of the other of said levers with another portion of said link, a beam movably associated with said tank having its medial portion disposable adjacent to said hollow pivot, and a pin penetrating said hollow pivot and coacting directly with said medial beam portion.

8. In combination, a tank having an opening, a closure plate for said opening, a pair of levers pivotally supported to swing about different axes, a link attached to said plate, a pivot connecting the swinging end of one of said levers with one portion of said link, a hollow pivot connecting the swinging end of the other of said levers with another portion of said link, a pin penetrating said hollow pivot, and a beam cooperable with said pin to force said plate into closed position.

9. In combination, a tank having an opening, a closure plate for said opening, a pair of levers pivotally supported to swing about different axes, a link attached to said plate, a pivot connecting the swinging end of one of said levers with one portion of said link, a hollow pivot connecting the swinging end of the other of said levers with another portion of said link, a pin penetrating said hollow pivot, a beam cooperable with said pin to force said plate into closed position, and means for adjusting said beam relative to said tank.

10. In combination, a tank having an opening, a closure plate for said opening, a pair of levers having corresponding ends swingably supported upon laterally spaced pivots, a link attached to said plate, and similarly laterally spaced pivots connecting the opposite ends of said levers with said link.

11. In combination, a tank having an opening, a closure plate for said opening, a pair of levers having corresponding ends swingably supported upon laterally spaced pivots carried by said tank, a link pivotally attached to said plate, and similarly laterally spaced pivots connecting the opposite ends of said levers with said link.

FREDERICK G. THWAITS.